United States Patent
Fox et al.

(10) Patent No.: US 8,097,067 B2
(45) Date of Patent: Jan. 17, 2012

(54) RUNTIME SENSOR FOR SMALL FORCED AIR HANDLING UNITS

(75) Inventors: Andrew R. Fox, Oakdale, MN (US); Dennis M. Glass, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 472 days.

(21) Appl. No.: 12/436,180

(22) Filed: May 6, 2009

(65) Prior Publication Data

US 2010/0282076 A1    Nov. 11, 2010

(51) Int. Cl.
*B01D 46/30* (2006.01)

(52) U.S. Cl. .................. 95/25; 95/1; 95/26; 55/DIG. 34; 96/417; 96/423; 96/424; 96/397; 73/24.01; 73/570

(58) Field of Classification Search ............. 55/DIG. 34; 95/1, 25, 26; 96/417, 423, 424, 397; 73/24.01, 73/570

See application file for complete search history.

(56) References Cited

U.S. PATENT DOCUMENTS

| | | | |
|---|---|---|---|
| 4,737,173 A | 4/1988 | Kudirka et al. |
| 4,747,364 A | 5/1988 | Horowitz |
| 4,921,509 A | 5/1990 | Maclin |
| 5,003,518 A | 3/1991 | Felder |
| 5,071,455 A | 12/1991 | Abedi-Asl |
| 5,188,727 A | 2/1993 | Kurth et al. |
| 5,337,003 A | 8/1994 | Carmichael et al. |
| 5,352,255 A | 10/1994 | Taft |
| 5,676,196 A | 10/1997 | Jakubzick et al. |
| 5,711,785 A | 1/1998 | Maxwell |
| 6,040,777 A | 3/2000 | Ammann et al. |
| 6,110,260 A | 8/2000 | Kubokawa |
| 6,190,442 B1 | 2/2001 | Redner |
| 6,466,134 B1 | 10/2002 | Ajearn |
| 6,508,868 B2 | 1/2003 | Pillion et al. |
| 6,620,222 B2 | 9/2003 | White |
| 6,651,654 B2 | 11/2003 | Rogacki |
| 6,888,466 B2 | 5/2005 | Dermody |
| 7,309,365 B2 | 12/2007 | Yuasa et al. |
| 7,395,710 B2 | 7/2008 | Daoud |
| 7,412,889 B2 | 8/2008 | Daoud |
| 7,875,100 B2 * | 1/2011 | Wright ............................... 95/8 |

(Continued)

FOREIGN PATENT DOCUMENTS

| | | |
|---|---|---|
| JP | 2007225566 | 9/2007 |
| KR | 10-0596603 B1 | 7/2006 |
| KR | 10-2005-0102644 A | 2/2007 |
| KR | 10-0921823 B1 | 11/2009 |

OTHER PUBLICATIONS

International Search Report PCT/US2010/033506 3 pages, Dec. 8, 2010.

*Primary Examiner* — Jason M Greene
*Assistant Examiner* — Dung H Bui
(74) *Attorney, Agent, or Firm* — Kenneth B. Wood

(57) ABSTRACT

Herein are disclosed devices and methods that can be used to provide an indication of the need to change a filter in a small forced air handling unit, based on the actual operating time (runtime) of the unit. The methods rely on the use of at least one vibration sensor that is placed in contact with a surface of an exterior component of the air handling unit and that can determine whether the unit is operating by sensing vibrations of the surface caused by operation of the unit.

20 Claims, 4 Drawing Sheets

U.S. PATENT DOCUMENTS

| | | |
|---|---|---|
| 2001/0045159 A1 | 11/2001 | Johnson et al. |
| 2002/0078830 A1 | 6/2002 | Chung et al. |
| 2003/0070544 A1 | 4/2003 | Mulvaney et al. |
| 2004/0031386 A1 | 2/2004 | Rauchfuss et al. |
| 2004/0057340 A1 | 3/2004 | Erickson et al. |
| 2007/0034396 A1 | 2/2007 | Berger et al. |
| 2007/0125075 A1 | 6/2007 | Zanini-Fisher et al. |
| 2007/0272082 A1 | 11/2007 | Johansson |
| 2007/0277592 A1 | 12/2007 | Johansson et al. |
| 2010/0082276 A1* | 4/2010 | Becker .......................... 702/56 |

* cited by examiner

RUNTIME SENSOR FOR SMALL FORCED AIR HANDLING UNITS

BACKGROUND

Disposable air filters are commonly used in small forced air handling units, such as residential heating, ventilating and air conditioning (HVAC) systems, and in portable air purification units. Such filters often include a frame and a fibrous filter material, and may include a reinforcing structure to help support the filter material. After a period of use, these filters become dirty or clogged and must be replaced. Proper filter maintenance helps keep the air handling unit operating at maximum efficiency and reduces operating costs.

Filter replacement is often done on a regular, fixed-interval basis. That is, the filter is replaced after a certain recommended fixed calendar period of time, such as three months, has passed. This fixed period of time, however, may not be appropriate for all situations (in particular, depending on the season of the year, which may affect how often the unit is actually operating during this calendar period). For example, the fixed time period may be too short, in which case the filter is discarded prematurely, or the fixed time period may be too long, in which case the filter is used beyond the time when it should have been changed.

Various filter change sensor systems have been proposed for indicating the need to change a filter. However, such systems tend to be complicated, may require one or more sensors to be placed within the air handling system (e.g., to measure pressure drop across the filter), and may require such sensors, controllers, etc. to be hard wired into the system. All of these can add to the cost and complexity of the system.

SUMMARY

Herein are disclosed devices and methods that can be used to provide an indication of the need to change a filter in a small forced air handling unit, based on the actual operating time (runtime) of the unit. The methods rely on the use of at least one vibration sensor that is placed in contact with a surface of an exterior component of the air handling unit and that can determine whether the unit is operating by sensing vibrations of the surface caused by operation of the unit.

Thus in one aspect, disclosed herein is a method of monitoring the runtime of a small forced air handling unit, comprising: sensing vibrations of a surface of an exterior component of an operating small forced air handling unit; recording the cumulative time that such vibrations occur over a period of time; and, providing a notification of the cumulative time of operation of the unit.

Thus in another aspect, disclosed herein is a method of determining whether a location of placement of a vibration sensor is suitable for monitoring the runtime of a small forced air handling unit, comprising: placing a vibration sensor in contact with a surface of an exterior component of the small forced air handling unit; operating the small forced air handling unit for a known period of time; recording the cumulative time over which vibrations are sensed by the vibration sensor; and, comparing the recorded cumulative time over which vibrations are sensed by the vibration sensor to the known period of time of operation of the small forced air handling unit.

These and other aspects of the invention will be apparent from the detailed description below. In no event, however, should the above summaries be construed as limitations on the claimed subject matter, which subject matter is defined solely by the attached claims, as may be amended during prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper" "lower", "under", "over", "front", "rear", "outward", "inward", "up" and "down", and "first" and "second" may be used in this disclosure, it should be understood that those terms are used in their relative sense only unless otherwise noted.

DETAILED DESCRIPTION

The methods and devices disclosed herein can be used with small forced air handling units, defined herein as including residential forced air handling units and portable air purification units.

Figure 1:
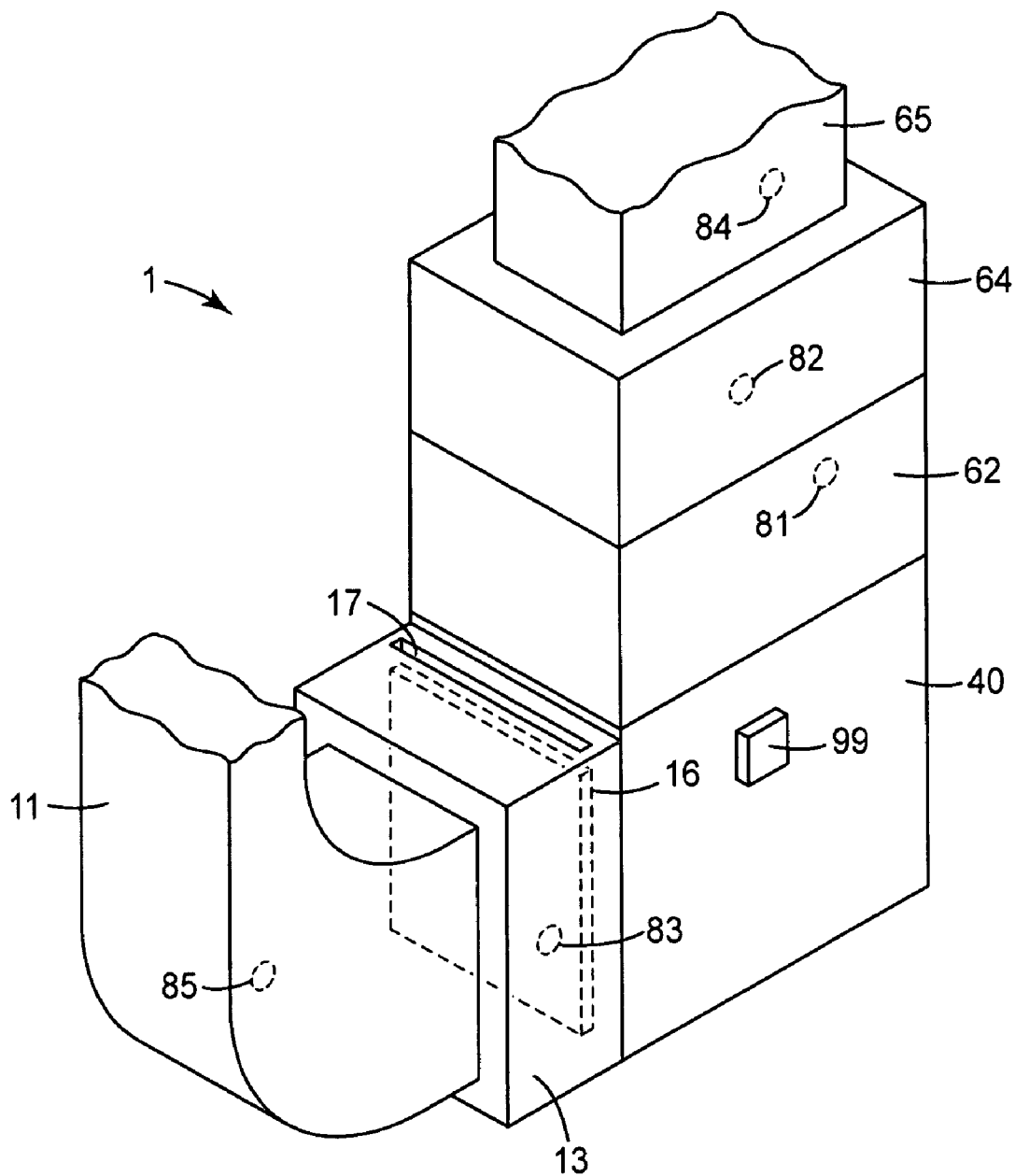
FIG. 1 is a perspective view of an exemplary residential forced air handling unit.
Figure 2:
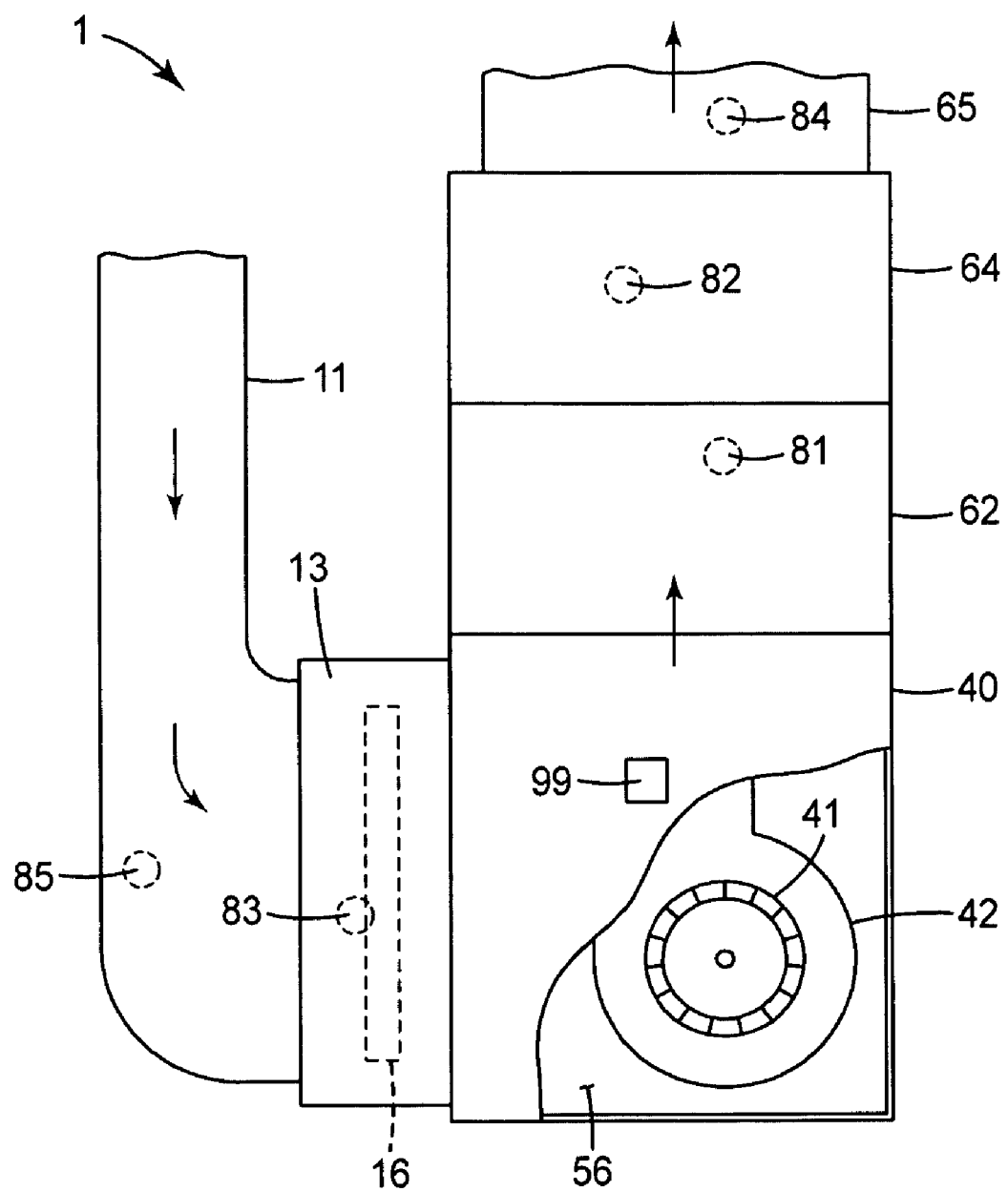
FIG. 2 is a side view, in partial cutaway, of the residential forced air handling unit of FIG. 1.

Shown in FIGS. 1 and 2 in generic representation is an exemplary residential forced-air handling unit 1. Such units are often used for the heating and/or cooling of a residential home (e.g., of a few thousand square feet or less) or a portion thereof. Such residential forced-air handling units may, for example, provide a heating capability (e.g., a heat input rate) of about 225,000 BTU/hr or less, and/or a cooling capacity of about ten tons or less. Unit 1 may comprise blower cabinet 40 within which is located blower fan 41. Blower cabinet 40 may contain a motor (not shown) for driving blower fan 41 by way of one or more belts, direct drive shafts, etc. (in some cases, such a motor may be located externally of blower cabinet 40 while still being operatively connected to blower fan 41). Unit 1 may comprise electrical equipment, controlling circuitry and the like (not shown), as needed for operation of unit 1. Such equipment may be located within blower cabinet 41 (e.g., in a compartment of blower cabinet 41); or, such equipment may be located in a separate compartment of unit 1. Unit 1 may comprise one or more panels that define certain of the exterior surfaces of unit 1. One or more of these panels may be removable, for example so as to allow access to the inside of blower cabinet 40, e.g. in order to access electrical equipment.

Unit 1 may comprise a chamber (often referred to as a return plenum) 13 which receives air from one or more air return ducts 11. The outlet of chamber 13 may feed into a receiving chamber 56 (which also may be referred to as a plenum) of blower cabinet 40. Air in receiving chamber 56 may be pressurized by blower fan 41 to flow into heat exchange chamber 62. Heat exchange chamber 62 may contain one or more heat exchangers (not shown) which may receive thermal energy from, e.g., a burner (not shown), and/or from one or more heat exchangers (likewise not shown)

which transfer thermal energy to cooling coils that are in communication with a compressor (typically located external to the enclosure, e.g. building, being air-conditioned), all of which are well known to those of skill in such arts. The heat-exchanged air may then leave chamber 62 and enter chamber 64 (often referred to as a supply plenum) which may be connected to one or more ducts 65 through which the heat-exchanged air is sent to various locations. (The arrows in FIG. 2 indicate direction of air flow through unit 1.) Depending on the size and/or complexity of unit 1, chambers 13 and/or 64 may comprise individual ducts rather than plenum chambers from which multiple ducts branch. Thus, in the context of the disclosures herein, the term residential forced air handling unit encompasses any or all of a blower cabinet, a compartment containing electrical equipment and the like, a heat exchange cabinet, and any plenum connected directly to such air handling cabinet or heat exchange cabinet. The term residential forced air handling unit as used herein additionally encompasses all portions of any air handling duct connected directly or indirectly to the blower cabinet or heat exchange cabinet or connected to a plenum chamber connected to the blower cabinet or heat exchange cabinet, including such components (e.g., a register, a louvered facing, etc.) as may be present at the terminal ends of the duct. The term residential forced air handling unit also encompasses any auxiliary equipment as might be physically connected to any part of unit 1 (including, for example, a humidifier, a condensate receptacle, an air purification unit (e.g., as might contain a permanently attached filter), and so on).

Blower fan 41 often comprises a small centrifugal (squirrel-cage) fan (e.g., about eighteen inches or less in diameter and operating at around 1500 RPM or less), driven by a belt-driven motor or a direct drive motor (e.g., operating at 1000-4000 RPM, and capable of producing around one horsepower or less). Blower fan 41 is often at least partially contained in fan housing 42, which may serve to protect blower fan 41, to guide air within blower cabinet 40 into the moving blades of blower fan 41, to guide air that is impelled by the moving blades of blower fan 41 in a desired direction within blower cabinet 40, etc.

Residential forced air handling unit 1 typically comprises filter 16 (shown in hidden lines in FIGS. 1 and 2), of the general type described herein. Filter 16 is typically positioned such that some or all of the air entering chamber 56 from chamber 13 passes through filter 16 so that particulates and/or debris can be removed therefrom. Often, a slot 17 is provided in a panel of unit 1 such that filter 16 can be slid into place.

Filter 16 may be any of a wide variety of commonly used air filters, for example a flat-panel type of filter including an interior filtering region of the filter, surrounded by a reinforcing frame. The interior filtering region may comprise a filter media which may be fiberglass, may be a fibrous non-woven material, may be pleated, and/or may be electrostatically charged to enhance its particle capturing ability.

As defined herein, the term residential forced air handling unit also includes so-called split (occasionally called minisplit) air conditioning systems. Such systems typically comprise a blower and a heat exchange chamber, the heat exchange chamber containing cooling coils that are in communication with a compressor located external to the enclosure (e.g., room) being conditioned. Such units may or may not comprise plenum chambers and/or ducts. As defined herein, the term residential forced air handling unit also includes window or wall mounted air conditioning units (such units typically comprise a blower fan, compressor, cooling coils, etc., all located within the same housing).

Figure 3:
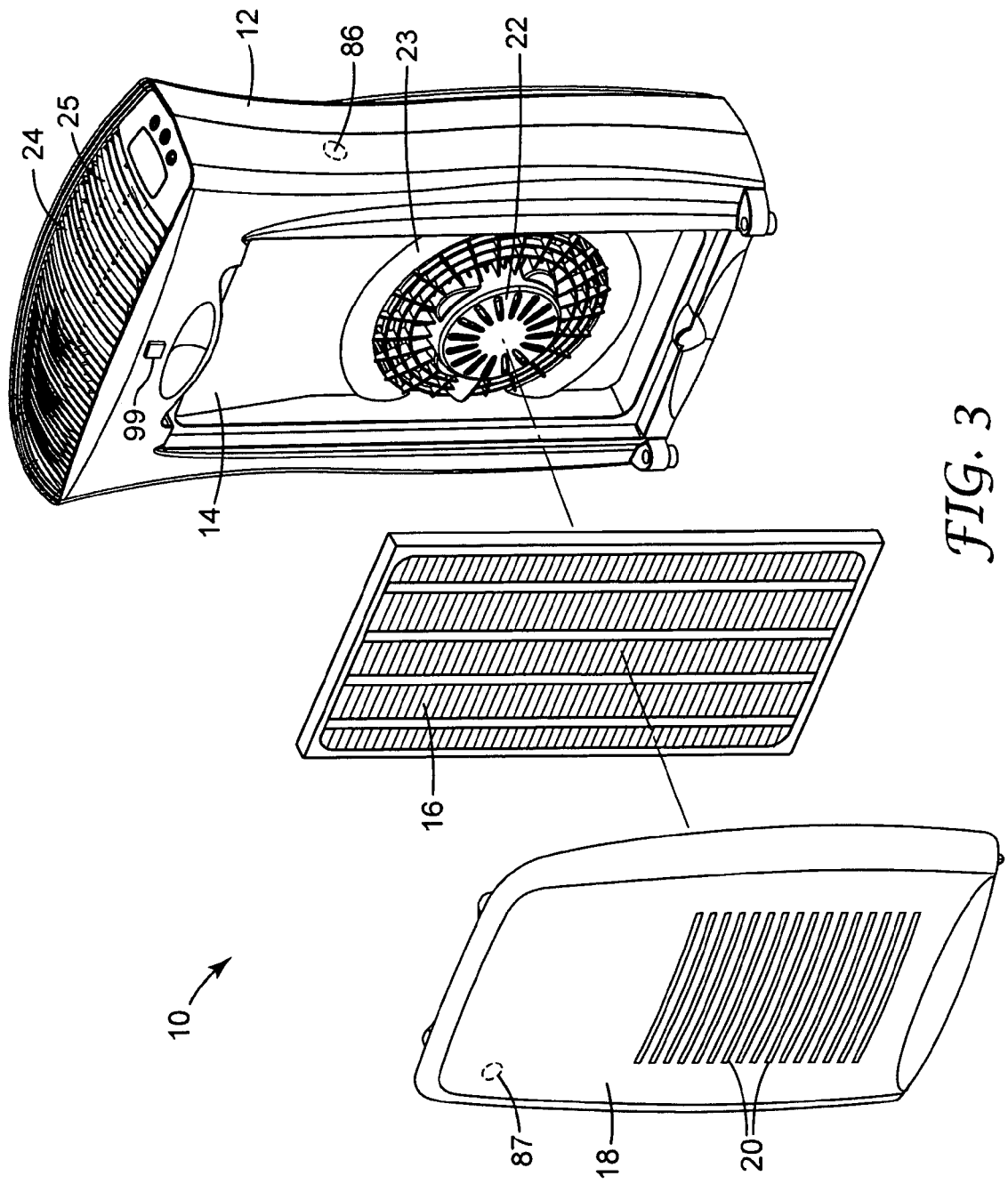
FIG. 3 is a partially exploded perspective view of an exemplary portable air purification unit.
Figure 4:
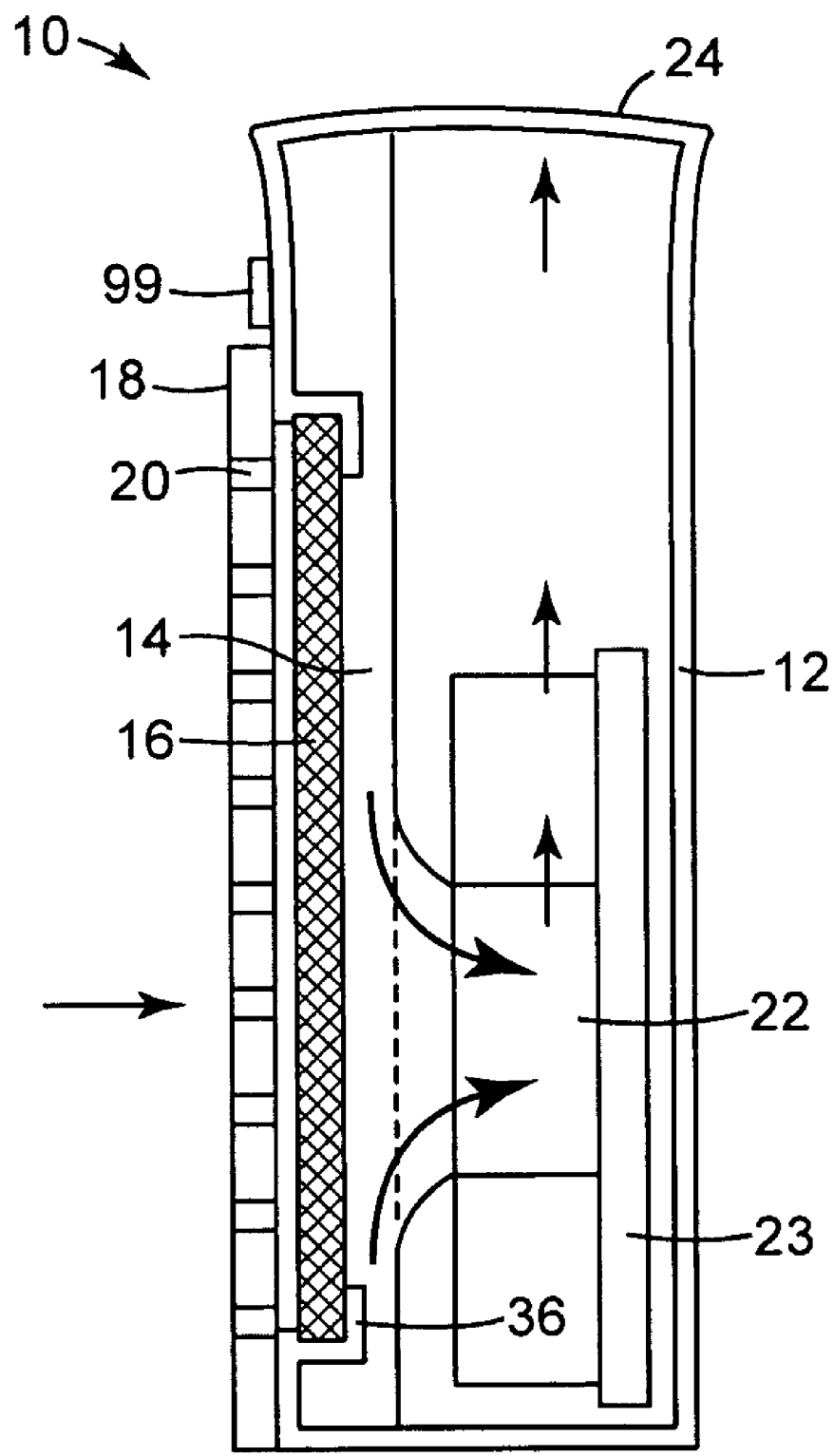
FIG. 4 is a side schematic cross sectional view of the exemplary portable air purification unit of FIG. 3.

FIGS. 3 and 4 show an exemplary portable air purification unit 10. Unit 10 may comprise exterior housing 12 containing air handling chamber 14, filter 16 removably arranged in chamber 14, and cover 18 removably arranged over filter 16. Cover 18 optionally includes air intake openings 20 that allow unfiltered air to enter air handling chamber 14 and pass through filter 16, whereby entrained contaminants such as dirt, dust, pollen, mold, smoke, pet dander, micro-organisms or any other airborne particles that can be captured by the particular filter used are removed from the air stream. Blower fan 22 is arranged in unit 10 to draw unfiltered air through air intake openings 20 of cover 18 and/or around the perimeter of cover 18, through filter 16, and into air handling chamber 14. After the air passes through filter 16, the filtered air exits unit 10 (under pressure from blower fan 22) through openings 25 in exit grill 24. (The arrows in FIG. 4 indicate direction of air flow). Certain portable air purifiers may comprise, in addition to the above-described filter 16, one or more prefilters (not shown), which may be designed to be changed more frequently than filter 16 and which may serve to extend the useful life of filter 16. Portable air purifiers of this general type are available, for example, from 3M Company of St. Paul, Minn., under the trade designation FAP00, FAP01, FAP02, and FAP03.

Although typically smaller than the filters used in residential forced air handling unit 1, filter 16 used in portable air purification unit 10 typically comprises similar filter media to that used in unit 1 and described above.

Blower fan 22 of unit 10 is typically smaller than blower fan 41 of unit 1 described above, and may for example be a small squirrel cage fan of the general type referred to above, a small axial fan, and the like, as is well known in the art. Blower fan 22 may be at least partially contained within air handling chamber 14, which may serve to protect blower fan 22, to guide air within air handling chamber 14 into the moving blades of blower fan 22, to guide air that is impelled by the moving blades of blower fan 22 in a desired direction within air handling chamber 14, etc.

Surprisingly, it has been discovered that vibration sensing can be used to provide runtime indications for small forced air handling units 1 and/or 10 as described herein. Specifically, vibration sensing can be used to monitor the total runtime (hours of actual operation (e.g., of blower fan 41 or blower fan 22)) of such a unit during operation (e.g., intermittent operation) of the unit over a period of time. Such runtime indication may allow filter 16 to be changed (or cleaned, as described later herein) based on the actual accumulated runtime of operation of the unit (i.e., time during which air is actually passing through filter 16) rather than simply relying on a calendar period of time.

This vibration sensing can be accomplished by the use of one or more vibration sensors 99 that are placed in contact with a surface of an exterior component of the small forced air handling unit. Within this context, an exterior component is defined as a component that is not a blower fan (i.e., blower fan 41 or blower fan 22) or a fan housing (i.e., fan housing 23 or fan housing 42). Such exterior components are described in further detail later herein.

Suitable vibration sensors may include those that utilize piezoelectric accelerometer detection mechanisms, and may include sensors containing solid-state components designed to perform such functions. Exemplary sensors that have been found suitable include, for example, those available from ENM Company, Chicago, Ill., under the trade designation T54.

Sensor(s) 99 may be placed in contact with a surface of such an exterior component for example by being attached to the surface, by any of a variety of methods. For example, sensor 99 may be attached via one or more mechanical attachment devices such as a screw, nail, clamp, clip, bracket, hook and loop connector, and the like. Or sensor 99 may be attached by soldering, welding, and the like. If the surface to which sensor 99 is desired to be attached is a suitable metal (e.g., a ferrous metal), magnetic attachment may be used. In some cases liquid adhesives (e.g., glue, cyanoacrylate, light-curable adhesive, epoxy, and the like), may be used. In some embodiments, sensor 99 may be attached to the component via a double faced pressure-sensitive adhesive. In specific embodiments, the double faced adhesive is a stretch-releasing adhesive, as are well known in the art. In particular locations it may be possible to place sensor 99 in position without sensor 99 being attached to the surface (e.g., sensor 99 might be placed upon a generally horizontal surface and held there by gravity); however, for adequate responsiveness of sensor 99 to vibrations of the surface, it may be advantageous for sensor 99 to be attached to the surface, e.g. by one of the methods listed above.

In some embodiments it may be advantageous to attach sensor 99 to a surface of an exterior component of the small forced air handling unit in a removable manner, as discussed later herein. In such cases, sensor 99 may be so attached by removable methods comprising for example a stretch-releasing adhesive, magnetic attachment, or the use of a removable clip, clamp, and the like.

The placement of sensor 99 on an exterior component of residential forced air handling unit 1 may be on any suitable surface of any panel of unit 1. Such a panel might for example be one that at least partially covers at least a portion of blower cabinet 40, at least a portion of a compartment of unit 1 that houses electrical equipment (such a compartment might be a compartment of blower cabinet 40 or a separate compartment of unit 1), and so on. Sensor 99 may be placed on any suitable surface of heat exchange chamber 62 (e.g., the location marked 81 in FIGS. 1 and 2), on any suitable surface of chamber 64 (e.g., the location marked 82 in FIGS. 1 and 2), and/or on any suitable surface of chamber 13 (e.g., the location marked 83 in FIGS. 1 and 2). Sensor 99 may be placed on a surface of attached auxiliary equipment (including for example a humidifier, a condensate receptacle, an air purification unit, etc., not shown in any Figure) that is physically connected to unit 1. Sensor 99 may be placed on any suitable surface of duct 65 (e.g., the location marked 84 in FIGS. 1 and 2), and on any suitable surface of duct 11 (e.g., the location marked 85 in FIGS. 1 and 2).

Placing as described herein refers to the placing of sensor 99 on a surface of a panel (which may be removable), wall, etc., that at least partially defines the particular cabinet, compartment, chamber, plenum, duct, auxiliary equipment, etc. While the exemplary locations shown on FIGS. 1 and 2 are located on surfaces on the "front" of unit 1 with reference to the orientation shown in FIG. 1, sensor 99 can be placed on any suitable surface (e.g., side, rear, upper, lower, etc.) of any exterior component of unit 1, as desired. While in the exemplary embodiments of FIGS. 1 and 2 the placement locations are shown on external (i.e., outwardly facing) surfaces of exterior components of unit 1, sensor 99 may in some embodiments be mounted on an internal (inwardly facing) surface of one of these exterior components (preferably such mounting may be in a location in which sensor is easily accessible). In certain embodiments, the supplier (e.g., manufacturer or installer) of the residential air handling equipment may designate and mark one or more suitable locations for placement of sensor 99. Multiple sensors 99 may be used with unit 1 if desired.

Since it is only necessary for sensor 99 to be able to determine whether unit 1 is operating (e.g., that blower fan 41 is running so as to cause air to pass through filter 16), no particular relationship or proximity between sensor 99 and filter 16 may be necessary. However, in certain embodiments sensor 99 could be attached to filter 16 if desired.

As mentioned, the methods and devices disclosed herein may be usefully applied to split air conditioning units and/or window or wall mounted air conditioning units, if such units comprise a filter 16. With regard to placement of sensor 99 on a split air conditioning unit or on a window or wall mounted air conditioning unit, such placement may be on a surface of any convenient exterior component, e.g., the housing of the blower unit of a split air conditioning unit, the housing of a window or wall mounted air conditioning unit, etc.

With regard to placement of sensor 99 on portable air purifier 10, sensor 99 may be positioned at any location such as on a front, back, side, top, or bottom external surface of exterior housing 12. For example, sensor 99 may be positioned on an external front surface of exterior housing 12 as shown in FIGS. 3 and 4, or may be positioned on a side external surface of exterior housing 12, as in e.g. location 86 of FIG. 3. Sensor 99 may be positioned on a suitable external surface of cover 18 (e.g., the location marked 87 in FIG. 3). (In this context, exterior housing 12 and cover 18 comprise exterior components of portable air purifier 10). Sensor 99 may also be positioned on an internal (inwardly facing) surface of an exterior component of unit 10 (e.g., exterior housing 12 or cover 18), although not shown in any Figures. The supplier (e.g., manufacturer) of unit 10 may determine one or more particularly suitable locations for mounting sensor 99 (for example on exterior housing 12 of unit 10) and may mark such locations, may provide built-in attachment features on unit 10 for sensor 99, may pre-attach sensor 99 to unit 10 at the factory, and so on.

Sensor 99 may be sold as a stand-alone item, may be sold as a kit in combination with one or more filters 16, may be sold as a kit in combination with a portable air purifier 10, may be preattached to a portable air purifier 10, and so on.

It has been surprisingly found that vibration sensors, which are commonly thought of by those of ordinary skill in the art as most useful in connection with monitoring of reciprocating engines, large and/or heavy equipment, machinery that creates significant vibrations and the like (e.g., internal combustion engines, compressors, etc.), can detect the operating of herein-described small forced air handling units that contain nonreciprocating, relatively low powered and smoothly rotating blower fans and drive motors thereof. It has been further discovered that such sensing of vibration in the case of such relatively low powered and smoothly operating blower fans can be successfully accomplished without the sensor necessarily being mounted directly in contact with a housing of the fan or blower. The discoveries herein may be particularly surprising in the case of residential forced air handling units, which are typically engineered to have minimal vibrations (e.g., through careful design of the fan body and blades thereof, the use of flexible connections between various components of the unit (e.g. such as between the air handler cabinet and the supply and/or output air plenum, between the plenum and ducts connected thereto, and so on). The discoveries herein may also be particularly surprising in the case of portable air purifiers, which typically comprise quite small, low-powered, and smoothly rotating fans.

Without being wishing to be limited by theory or mechanism, the inventors hypothesize that vibrations as detected herein may be directly transmitted (e.g., from the moving fan body and/or the fan housing and/or the drive motor) through solid components of the small forced air handling unit to the exterior component to which sensor 99 is attached. Or, they may result from the exterior component to which sensor 99 is attached being set into motion in response to air (driven by the blower or fan) moving in contact with a surface of the exterior component. Consequently, the occurrence and amount of vibration of any given surface of any given exterior component of the air handling unit may be quite complex and/or at least partially governed by resonance phenomena. For example, during operation of the small forced air handling unit, the various exterior components of the unit may be set into motion to a different degree, depending on their size, weight, thickness, rigidity, and so on. Further, within any given exterior component, different amounts of vibration may occur at different locations on the component, again depending on factors such as size, weight, rigidity, etc.

Given these complications, a suitable location for placement of sensor 99 may be chosen to advantage according to the methods disclosed herein. Relatively large, generally planar panels, particularly those that are only connected to or in contact with other components of the small forced air handling unit at the perimeter edges of the panel, may be particularly suitable since the relatively large free span (e.g., unsupported area between connections to other components) of the panel may allow significant vibration. Further, for such panels, more vibration may occur at or near the center of the free-spanning central portion than near the edges of the panel.

Thus, it may be advantageous to position sensor 99 on a panel of an exterior component of unit 1, at least about 4 inches from an edge of the panel (e.g. a point or line of connection of the panel to some other component of unit 1). It may further be advantageous to position sensor 99 near the center of a relatively large panel (e.g. a panel of blower cabinet 40, or of any of the previously mentioned chambers or ducts) of an exterior component of unit 1. In this context, near the center means, with respect to the geometric center of the panel, located at a distance that is, along a path toward any edge of the panel, less than 20% of the distance from the geometric center to the edge. In this context, relatively large may comprise, in various embodiments, at least about one square foot, at least about two square feet, or at least about four square feet.

The above are only general guidelines however, and of course, the design of residential air handling units varies widely. And, as related previously, the occurrence and amount of vibration of any particular area of any particular component of the air handling unit may be affected by resonance phenomena and can thus be complicated and unpredictable. Therefore, for any given air handling unit it may be useful to determine a suitable or optimal location for sensor 99 to reside. Thus, methods disclosed herein include the temporary placing of a vibration sensor 99 in contact with a surface of an exterior component of a small forced air handling system, at a potentially suitable location, and then performing a test to determine whether the sensing element can detect vibrations at that location with acceptable accuracy for the sensing element to function as a runtime indicator. This may be done for example by positioning the sensor in a potentially suitable location, operating the small forced air handling unit (e.g., by at least turning on the blower fan if not already in operation), allowing the unit to run for a time, and then determining whether the vibration sensor registers a runtime (the cumulative (total) time during which vibrations are sensed by the vibration sensor) sufficiently close to (e.g., within 85% of) the time that the unit was actually in operation.

If so, the location may be deemed suitable and the sensor may remain at that location. If not, the sensor may be moved to a different potentially suitable location and the test procedure repeated.

The performing of such testing to determine an optimal location for vibration sensor 99 to be placed may require that the vibration sensor be placed in position in a removable manner. Such mounting may advantageously be done for example by the use of stretch-releasing tape, by magnetic mounting, or by other removable methods. With particular regard to the use of stretch-releasing adhesive tape, the inventors have found that an exemplary sensing element can be mounted to an exterior component of typical residential forced air handling system, or to a typical portable air humidifier, by such adhesive tape and can at least in some cases satisfactorily detect vibration of the unit. Such findings may be somewhat unexpected since pressure-sensitive adhesives (of which stretch-release tapes comprise a particular type) are well known as having vibration damping properties and indeed have been sold as vibration damping products for many years. These unexpected findings mean that not only can vibration sensor 99 be temporarily attached to an exterior component of a small forced air handling unit via a removable method (so that it can be easily removed and moved to another location if the first is found inadequate), sensor 99 can be kept in place indefinitely (e.g., for months or years) via a stretch releasing adhesive and easily removed thereafter. The use of such removable attachment methods may also enhance the ease with which the sensor can be removed, e.g. if necessary in order to change the battery.

Sensor 99 may provide a runtime indication via any suitable notification signal. Such a signal may be quantitative or nonquantitative. For example, a readout on a display on sensor 99 may indicate the hours, days, weeks, etc. of runtime. A notification signal (e.g., a red light, a blinking light, etc.) may be triggered upon the reaching of a certain amount of runtime. Instead of or in addition to a visual notification signal, the notification signal may be audible, or may comprise a wireless signal transmitted to a receiving station (e.g., a home computer). Such notification signals may be particularly useful if sensor 99 is not in an easily visible location.

Sensor 99 may posses other functions beyond simply sensing of vibration. It may comprise multiple operating modes of variable sensitivity (e.g., high sensitivity, low sensitivity, etc.) which may be settable or adjustable by the user. The runtime may be resettable to zero (e.g., at the time at which a filter is changed or cleaned).

The runtime after which a particular filter is to be changed or cleaned may be selectable by the user. In particular, sensor 99 may comprise the ability to emit an obvious reminder (e.g., a light, an audible signal, and so on), upon the reaching of a selected runtime. The desired runtime may be selected based on the parameters of the particular filter and/or small forced air handling unit involved, as well as other factors. For example, an algorithm (whether printed, e.g., in the form of a table or chart, or in electronic form or a software program), may be provided along with filter 16 (e.g., by the manufacturer or supplier of filter 16) that may enable a user to select an optimum runtime for that particular filter 16. Such an algorithm may take into account, for instance, the characteristics of the particular filter and/or certain parameters (such as size, fan speed, etc.) of the particular small forced air handling unit. The algorithm may also take into account any or all of: the season of the year, environmental conditions (e.g., whether a residence is located in a dusty area), particular features of a residence (e.g., the presence and/or number of pets), and so on) the sensitivity of persons (e.g., allergies), and so on. While primarily discussed above with regard to residential forced air handling unit 1, such considerations are also applicable to portable air purifier 10. In particular regard to use with portable air purifier 10, sensor 99 may be configured with a runtime optimized for changing of filter 16, and/or for changing of any prefilter that may be present in portable air purifier 10.

In certain embodiments, sensor 99 may comprise (e.g., in combination with variable sensitivity) the ability to be placed in a learning mode. In such a circumstance, a user may place sensor 99 in contact with a surface of an exterior component of small forced air handling unit, and place sensor 99 in learning mode. The unit may then be turned on (e.g., at least the blower fan thereof) at which point sensor 99 may be able to determine, and record for future use, the difference between vibration levels that correspond to the unit being in operation versus being turned off. Sensor 99 may further automatically adjust its operating sensitivity accordingly.

Sensor 99 may comprise various interfaces (e.g., buttons, controls, etc.) by which a user may activate sensor 99, reset the runtime to zero, change the sensitivity of detection (if sensor 99 comprises such functionality), and the like, as described herein.

In certain embodiments, sensor 99 may be hard wired into the small forced air handling unit. In other embodiments sensor may be plugged into an electrical outlet. In other embodiments sensor 99 may rely on an internal power source (e.g., a battery).

Although the disclosures herein have been presented primarily in the context of providing an indication of when to change a disposable/replaceable filter, some small forced air handling units may comprise permanently installed filters. In such case, the methods described herein may be useful in determining when such filters should be cleaned. Likewise, other components of air handling systems that require periodic checking, maintenance, replacement, etc. (e.g., humidifiers and the like) may also profit from the methods described herein.

Examples

The tests and test results described above are intended solely to be illustrative, rather than predictive, and variations in the testing procedure can be expected to yield different results. The foregoing detailed description and examples have been given for clarity of understanding only. No unnecessary limitations are to be understood therefrom.

Model T54 Vibration Activated Hour Meters (produced by ENM Company, Chicago, Ill.) were obtained. Each meter was attached to an external surface of an exterior component of a residential forced air handling unit of a typical single-family house in Minnesota. The attachment was by way of a strip of stretch releasing adhesive (available from 3M Company, St. Paul, Minn., under the trade designation Command). Multiple residential forced air handling units were tested. Various attachment locations were evaluated. The recorded runtime provided by the meter was compared to the actual running time (in continuous operation) of the blower fan of the unit. The ratio of the recorded runtime to the actual running time is listed in the following table as percentage accuracy.

TABLE 1

| Unit | Position of Meter | Actual Runtime (hours) | Recorded Runtime (hours) | % Accuracy |
|---|---|---|---|---|
| 1 | On horizontal surface of top of blower cabinet (that protruded ~4 inches outward beyond lower edge of heat exchange chamber)[1] | 3.3 | 0.6 | 18 |
| 1 | On heat exchange chamber panel[2] | 14.0 | 14.0 | 100 |
| 2 | On (removable) panel of blower cabinet/heat exchange chamber[3] | 4.6 | 4.6 | 100 |
| 2 | On (removable) panel of blower cabinet/heat exchange chamber[4] | 10.2 | 10.1 | 99 |

[1]Location not shown in any Figure.
[2]Location approximately equivalent to location 81 of FIGS. 1 and 2.
[3]Location approximately equivalent to location 81 of FIGS. 1 and 2.
[4]Location approximately equivalent to location 81 of FIGS. 1 and 2.

The above-referenced meters were attached to an external component of a portable air purifier (available from 3M Company under the trade designations listed in Table 2). The attachment was by way of a strip of stretch releasing adhesive (available from 3M Company, St. Paul, Minn., under the trade designation Command). Multiple portable air purifiers were tested. Various attachment locations were evaluated. The fan speed of the units were varied. The recorded runtime provided by the meter was compared to the actual running time (in continuous operation) of the blower fan of the unit. The ratio of the recorded runtime to the actual running time is listed in the following table as percentage accuracy.

TABLE 2

| Purifier | Fan speed | Position of Meter | Actual runtime (hours) | Recorded Runtime (hours) | % Accuracy |
|---|---|---|---|---|---|
| FAP00 | Low | Front near top | 16.3 | 14.2 | 87 |
| FAP00 | High | Front near top | 24.0 | 23.2 | 97 |
| FAP01 | Low | Top of filter cover | 16.3 | 6.9 | 42 |
| FAP01 | Low | Side of front housing near bottom | 1.5 | 0.0 | 0 |
| FAP01 | Low | Side of front housing near bottom | 2.4 | 1.4 | 58 |
| FAP01 | Medium | Top of filter cover | 24.0 | 22.6 | 94 |
| FAP01 | Medium | Side of front housing near bottom | 1.3 | 0.0 | 0 |
| FAP02 | High | Top right of filter cover | 16.0 | 15.8 | 99 |

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A method of monitoring the runtime of a small forced air handling unit, comprising:
    sensing vibrations of an external surface of an exterior component of an operating small forced air handling unit;
    recording the cumulative time that such vibrations occur over a period of time; and,
    providing a notification of the cumulative time of operation of the unit.

2. The method of claim 1 wherein the vibration sensing is performed by a vibration sensor that is in contact with the external surface of the exterior component of the unit.

3. The method of claim 2 wherein the vibration sensor is removably attached to the external surface of the exterior component of the unit.

4. The method of claim 3 wherein the vibration sensor is removably attached to the external surface of the exterior component by at least one stretch releasing adhesive.

5. The method of claim 3 wherein the vibration sensor is removably attached to the external surface of the exterior component by at least one magnet.

6. The method of claim 2 wherein the vibration sensor is resettable to a cumulative time of zero.

7. The method of claim 2 wherein the small forced air handling unit comprises a residential forced air handling unit.

8. The method of claim 7 wherein the vibration sensor is in contact with an external surface of a panel that at least partially defines at least one of a blower cabinet, electrical compartment, plenum chamber, heat exchange chamber, duct, or attached auxiliary equipment, of the residential forced air handling unit.

9. The method of claim 8 wherein the vibration sensor is placed on an external surface of a panel of the small forced air handling unit, at least about four inches from all edges of the panel.

10. The method of claim 9 wherein the vibration sensor is placed near the center of a generally flat panel that comprises at least two square feet in area.

11. The method of claim 2 wherein the small forced air handling unit comprises a portable air purifier and wherein the vibration sensor is placed in contact with at least one of an external surface of an exterior housing, or a surface of a removable cover, of the portable air purifier.

12. The method of claim 11 wherein the vibration sensor is placed in contact with at least one of an external surface of the exterior housing, or a surface of the removable cover, at a location designated by the supplier of the portable air purifier.

13. The method of claim 2 wherein the vibration sensor provides a notification signal upon the reaching of a specified runtime.

14. The method of claim 13 wherein the small forced air handling unit comprises at least one disposable air filter and wherein the method further comprises the step of disposing of the at least one disposable air filter and replacing it with another disposable air filter.

15. The method of claim 14 wherein the runtime after which the disposable air filter is to be changed is chosen based on an algorithm provided along with the at least one disposable air filter.

16. The method of claim 13 wherein the specified runtime at which the notification signal is provided is adjustable.

17. A method of determining whether a location of placement of a vibration sensor is suitable for monitoring the runtime of a small forced air handling unit, comprising:
    a) placing a vibration sensor in contact with an external surface of an exterior component of the small forced air handling unit;
    b) operating the small forced air handling unit for a known period of time;
    c) recording the cumulative time over which vibrations are sensed by the vibration sensor; and,
    d) comparing the recorded cumulative time over which vibrations are sensed by the vibration sensor to the known period of time of operation of the small forced air handling unit.

18. The method of claim 17 further comprising determining whether the recorded cumulative time over which vibrations are sensed by the vibration sensor is at least 85% of the known period of time of operation of the small forced air handling unit; and, if not equal to at least 85%, moving the vibration sensor to a different location and repeating steps a) through d).

19. The method of claim 17 wherein step a) is performed by removably attaching the vibration sensor to the external surface of the exterior component of the small forced air handling unit.

20. The method of claim 19 wherein the vibration sensor is attached to the surface via a stretch releasing adhesive.

* * * * *

UNITED STATES PATENT AND TRADEMARK OFFICE
CERTIFICATE OF CORRECTION

PATENT NO. : 8,097,067 B2
APPLICATION NO. : 12/436180
DATED : January 17, 2012
INVENTOR(S) : Andrew R Fox It is certified that error appears in the above-identified patent and that said Letters Patent is hereby corrected as shown below:

IN THE SPECIFICATIONS:

Column 2
Line 23, delete ""upper"" and insert -- "upper", --, therefor.

Column 8
Line 42, delete "posses" and insert -- possess --, therefor.

Signed and Sealed this
First Day of May, 2012

David J. Kappos
Director of the United States Patent and Trademark Office